US006967854B2

(12) United States Patent
Lai et al.

(10) Patent No.: US 6,967,854 B2
(45) Date of Patent: Nov. 22, 2005

(54) CONFIGURABLE POWER SUPPLY SYSTEM FOR MACHINE COMPONENTS

(75) Inventors: Kam Kwong Lai, Kwai Chung (CN); Ka Kin Wong, Kwai Chung (CN); Chi Wah Kadett Yuen, Kwai Chung (CN); Chi Wai Jeff Tang, Kwai Chung (CN)

(73) Assignee: ASM Assembly Automation Ltd., Hong Kong (HK)

( * ) Notice: Subject to any disclaimer, the term of this patent is extended or adjusted under 35 U.S.C. 154(b) by 26 days.

(21) Appl. No.: 10/699,072

(22) Filed: Oct. 30, 2003

(65) Prior Publication Data

US 2005/0094423 A1   May 5, 2005

(51) Int. Cl.[7] .............................................. H02M 7/00
(52) U.S. Cl. .............................. 363/65; 363/71; 363/69
(58) Field of Search .............................. 363/65, 68, 69, 363/70, 71

(56) References Cited

U.S. PATENT DOCUMENTS

| | | | | |
|---|---|---|---|---|
| 4,074,182 A | * | 2/1978 | Weischedel | 323/269 |
| 4,257,090 A | * | 3/1981 | Kroger et al. | 363/65 |
| 4,894,764 A | * | 1/1990 | Meyer et al. | 363/65 |
| 5,319,536 A | * | 6/1994 | Malik | 363/65 |
| 5,418,707 A | * | 5/1995 | Shimer et al. | 363/65 |
| 5,428,523 A | * | 6/1995 | McDonnal | 363/71 |
| 5,530,635 A | * | 6/1996 | Yashiro | 363/65 |
| 5,712,540 A | * | 1/1998 | Toda et al. | 318/46 |
| 5,768,117 A | * | 6/1998 | Takahashi et al. | 363/65 |
| 6,707,285 B2 | * | 3/2004 | Telefus et al. | 323/300 |

* cited by examiner

*Primary Examiner*—Bao Q. Vu
(74) *Attorney, Agent, or Firm*—Ostrolenk, Faber, Gerb & Soffen, LLP

(57) ABSTRACT

The invention provides a power supply system and a method for providing a power supply for a machine having a plurality of components. The system comprises a power source and a set of two or more voltage converters connected in parallel and coupled to the power source via a common bus. An electrical supply line is coupled to an output of the set of voltage converters for supplying a required voltage to the components of the machine connected to the electrical supply line.

26 Claims, 3 Drawing Sheets

_US 6,967,854 B2_

CONFIGURABLE POWER SUPPLY SYSTEM FOR MACHINE COMPONENTS

FIELD OF THE INVENTION

The invention relates to a power supply system for supplying electrical power to a machine. The machine has a number of components, and each component needs to be connected an electrical power supply for operation.

BACKGROUND AND PRIOR ART

Machines in the semiconductor assembly industry often have a number of electrically driven components, each of which requires an electrical supply in order to operate. These components have different functions, and may well have different requirements as regards voltage, current and/or consistency of power supply. The question of how to optimally supply power to these myriad components is of interest to the industry. An example of such a machine used for semiconductor assembly is an automated die bonding machine, which is used to place semiconductor chips onto a carrier, such as a lead frame or substrate. It has, amongst its components, motors to drive a bond head and to drive a wafer table, optical components for monitoring the die bonding process and logic circuitry to synchronize and manipulate the various components. The power supply system is usually rated in the 600 W to 4 kW range.

According to current practice, each component or set of components is connected to a suitably-rated power supply module that is sufficient to serve the electrical power needs of the components connected to it. Each rated power supply module is a separate device, and each separate module is compartmentalized and preferably stored adjacent each other at a location accessible to the components of the die bonding machine. Each module is designed to be able to supply enough electrical current for all permutations of power requirements. For example, a servomotor requires an initial surge in power input in order to start up the motor before stabilizing at a fairly constant continuous rating level once the load it is driving is moving. A power rating that is sufficient to handle the subsequent constant rating as well as the initial motor surge load is thus necessary to avoid tripping of the power supply during start-up. As a result, there is wastage of capability in having a high power rating to cater for such a type of component or equipment that does not continuously require a high rating. This approach is not cost-effective.

Furthermore, each power supply module is of itself a complete power supply system and takes up space. There is no scalability since each module is designed for a particular rating or maximum power output, and new complete modules have to be added if a higher power rating is required. Thus, there is an inefficient use of resources and there is limited scope to keep costs down while at the same time including redundancy in the system. Moreover, each complete module has to be replaced if it is faulty, which would also tend to increase down-time and costs.

Another problem with using separate power supply modules to serve the machine is that a relatively complex control circuit needs to be implemented, which increases the overall cost of the system. It would thus be desirable to utilize a central power supply that is configurable at a lower cost to supply electrical current to diverse components comprised in a machine.

SUMMARY OF THE INVENTION

It is thus an object of the present invention to seek to introduce an improved power supply system as compared to the prior art to avoid some of the above disadvantages.

According to a first aspect of the invention, there is provided a power supply system for a machine having a plurality of components, comprising: a power source; a set of two or more voltage converters connected in parallel and coupled to the power source via a common bus; and an electrical supply line coupled to an output of the set of voltage converters for supplying a required voltage to the components of the machine connected to the electrical supply line.

According to a second aspect of the invention, there is provided a method of providing a power supply to a machine having a plurality of components, comprising the steps of: coupling a set of two or more voltage converters connected in parallel to a power source via a common bus; coupling an electrical supply line to an output of the set of voltage converters; and connecting the components to the electrical supply line.

The invention as described in the preferred embodiment is capable of providing a modular and scalable design that makes use of a single power source, yet is able to offer versatility to configure power output to meet the needs of a machine.

It will be convenient to hereinafter describe the invention in greater detail by reference to the accompanying drawings which illustrate one embodiment of the invention. The particularity of the drawings and the related description is not to be understood as superseding the generality of the broad identification of the invention as defined by the claims.

BRIEF DESCRIPTION OF THE DRAWINGS

An example of a preferred embodiment of a power supply system in accordance with the invention will now be described with reference to the accompanying drawings, in which.

DETAILED DESCRIPTION OF THE PREFERRED EMBODIMENT

Figure 1:
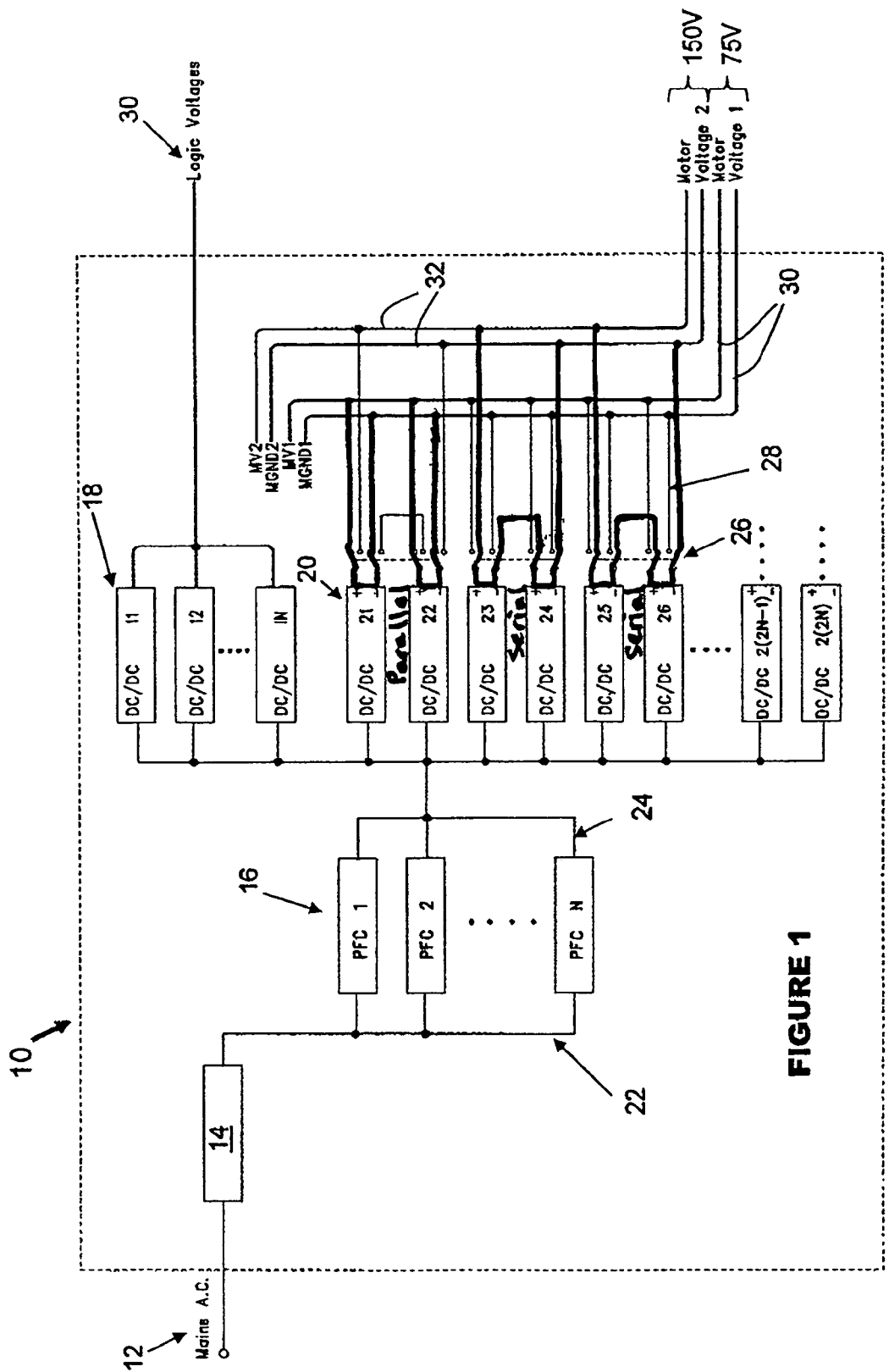
FIG. 1 is a schematic diagram of an exemplary set-up of a power supply system according to the preferred embodiment of the invention.
Figure 1A:
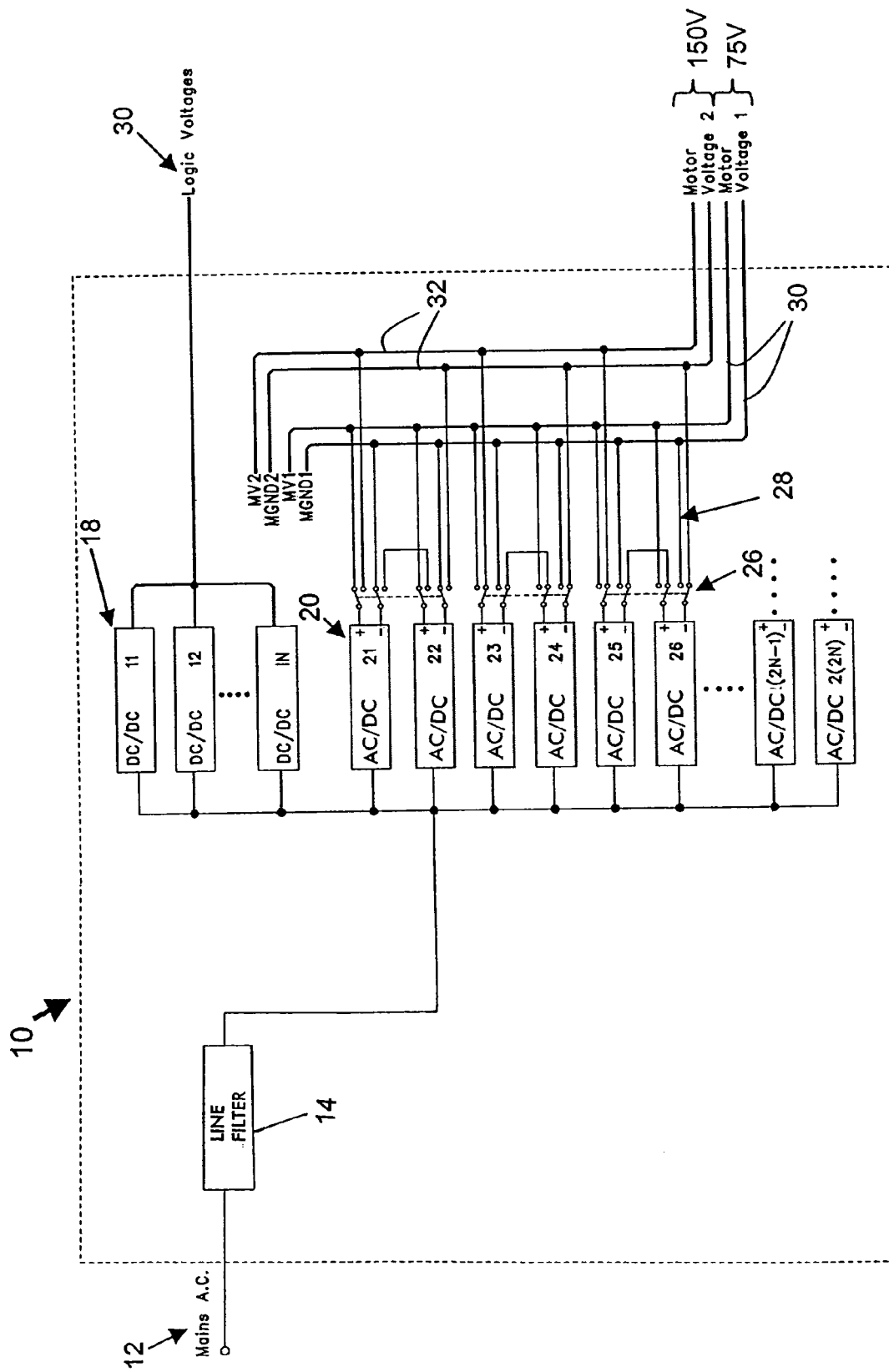
FIG. 1A is a schematic diagram of an exemplary set-up of a power supply according to an alternative embodiment of the invention.

FIG. 1 is a schematic diagram of an exemplary set-up of a power supply system 10 for a machine having a plurality of components according to the preferred embodiment of the invention. The machine may be one used in semiconductor assembly, or more particularly, a die bonding machine. Current to the power supply system 10 is supplied from a power source, which is commonly in the form of a mains AC voltage supply 12. The voltage is first passed through a line filter 14 to reduce any conductive noise coming from the power source or noise emitted from the system itself.

Thereafter, the voltage is fed through an AC power bus 22 to a power factor correction system 16. The power factor correction system 16 is useful for bringing the power factor of the power supply system to closer to unity. The apparent power input is brought as close as possible to the total real power drawn by the power supply and the component's load. This results in increased efficiency of the power supply and its upstream components. Consequently, upstream components need not be over-rated as much as compared to conventional power supplies.

Preferably, the power factor correction system 16 comprises a plurality of individual power factor correction devices PFC 1, PFC 2 . . . PFC N that are connected in parallel. The parallel set-up allows for redundancy to be built into the design and enhances scalability according to the power rating of the system. Therefore, to cater for an increase in power rating, one or more power correction devices may be added in parallel to the power factor correction system 16.

An AC-to-DC converter is preferably built into the power factor correction system 16 (as elaborated upon below with respect to FIG. 2), such that the system 16 has a DC voltage output. The DC voltage is carried by a common DC power bus 24 connected to the power factor correction system 16 and transmitted to a set of two or more voltage converters, such as DC/DC converters, connected in parallel. The set of voltage converters is configured to detachably receive additional voltage converters for coupling to the power source and electrical supply line. The voltage of the common DC power bus 24 is preferably within the range of 300–400 V DC.

The voltage or DC/DC converters may be connected to form a component power supply converter system 20. A separate set of DC/DC converters connected to form a logic voltage converter system 18 may be coupled to the power source for supplying one or more logic voltages to the machine. The logic voltage converter system 18 includes a number of DC/DC converters DC/DC 11, DC/DC 12 . . . DC/DC 1N that may comprise four-channel DC/DC converters. They are connected in parallel so as to allow for redundancy to be built into the design. This boosts output power and helps to avoid overload to the DC/DC converters that are connected to the logic components. DC/DC converters may be added or removed to the logic voltage converter system 18 according to the power rating required. The logic voltage converter system 18 is configured to output one or more different logic voltages, which are typically 5V, +/−15V and 24V split into four channels.

The component power supply converter system 20 includes a number of DC/DC converters DC/DC 21, DC/DC 22, DC/DC 23, DC/DC 24, DC/DC 25, DC/DC 26 . . . DC/DC 2(2N−1), DC/DC 2(2N). They may comprise one-channel DC/DC converters. They are configured generally in parallel, but two or more of the DC/DC converters may also be connected in series to increase output voltage. As mentioned above, connecting the DC/DC converters in parallel boosts output power to drivers driving the components, especially motors, and provides N+1 redundancy. The system is designed so that an additional voltage or DC/DC converter may be connected in parallel to other DC/DC converters for providing an output current that is higher than a current required by the components connected to an electrical supply line coupled to the DC/DC converters so as to minimize the risk of current overload causing failure to the system. A high output voltage of more than 48V DC for each DC/DC converter is preferred. Using this design, a short-time output power could be doubled to cater for a motor surge load. Therefore, a lower total rating as compared to conventional power supplies is possible. Furthermore, the rated current limit is variable.

To allow the option of interchangeably configuring a DC/DC converter with another DC/DC converter in series or in parallel, it is preferable that a switching module in the form of a pair of switches 26 are associated with each DC/DC converter of the component power supply converter system 20. The switches 26 direct DC voltage to output terminals 28 of the DC/DC converters that are in turn connected to electrical supply lines that supply electric power to the components of the machine. In the embodiment shown in FIG. 1, a first electrical supply line 30 provides an output voltage of 75V, whereas an output of a second electrical supply line 32 is double that of the first electrical supply line, at 150V. It is to be noted that the second electrical supply line 32 is an example of a plurality of electrical supply lines that could be provided given an appropriate arrangement of switches associated with each DC/DC converter.

The following is a more detailed description of the connections between the DC/DC converters. In this embodiment, each individual DC/DC converter of the component power supply converter system 20 is designed to provide an output voltage of 75V. Referring to FIG. 1, the DC/DC converters DC/DC 21 & 22 are configured in parallel to provide a 75V output to the first electrical supply line 30. The extra DC/DC converter allows for N+1 redundancy. On the other hand, a pair of DC/DC converters DC/DC 23 & 24 are connected in series to provide a 150V output to the second electrical supply line 32. Another pair of DC/DC converters DC/DC 25 & 26 providing a 150V output is connected in parallel to the pair of DC/DC converters DC/DC 23 & 24 to allow for N+1 redundancy in relation to the second electrical supply line 32.

Figure 2:
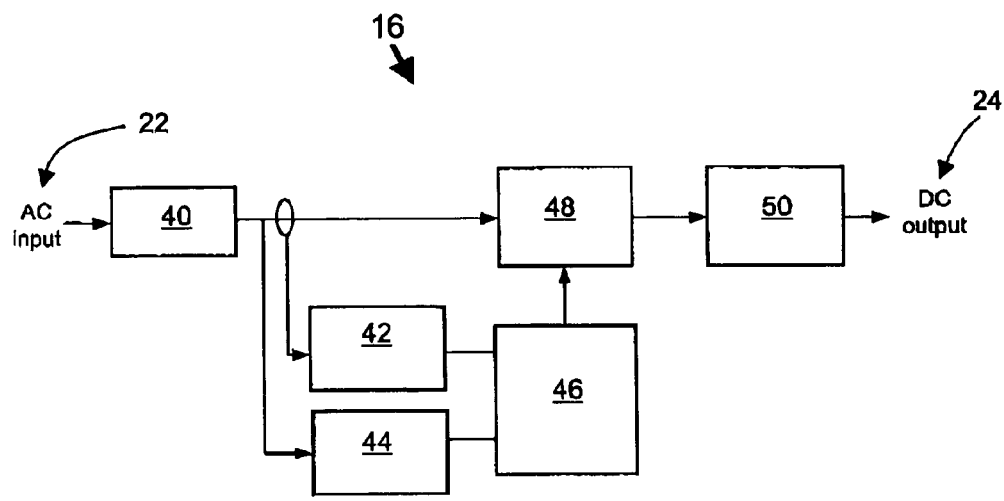
FIG. 2 is a block diagram of an exemplary set-up of a power factor correction device of a power factor correction system of the power supply system.

FIG. 2 is a block diagram of an exemplary set-up of a power factor correction device of the power factor correction system 16 of the power supply system 10. AC voltage is input via the AC power bus 22 to an AC-to-DC rectifier 40 for converting AC voltage to DC voltage, which is a rectified form of the AC voltage without smoothing. A power factor correction controller 46 controls a voltage booster 48 so that the power factor correction device input current as measured by a current detector 42 matches an input voltage waveform as measured by voltage detector 44. At the same time, power factor correction controller 46 regulates voltage on DC power bus 24 to the required tolerance. A hold-up capacitor 50 smooths out the voltage on DC power bus 24, and provides enough energy for the system to ride though short-term fluctuations in AC voltage input.

Figure 3:
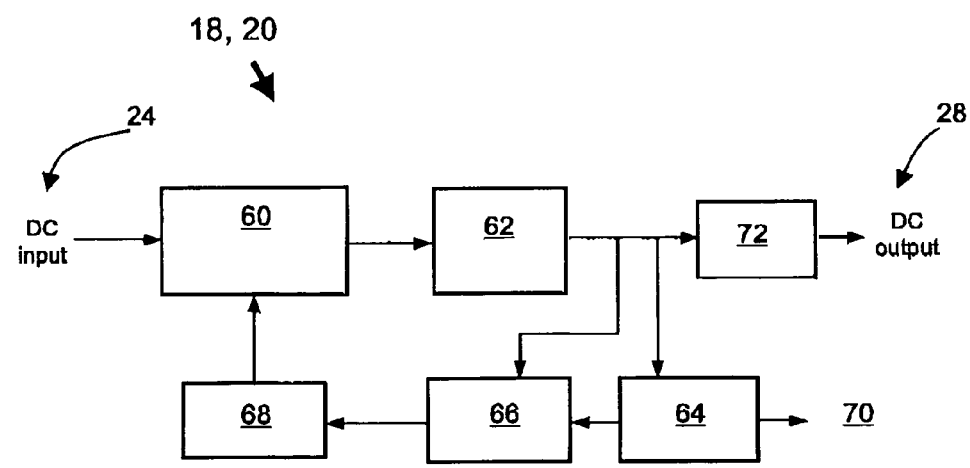
FIG. 3 is a block diagram of an exemplary set-up of a DC/DC converter of a DC/DC converter system of the power supply system.

FIG. 3 is a block diagram of an exemplary set-up of a DC/DC converter of the DC/DC converter systems 18, 20 of the power supply system 10. Preferably, each DC/DC converter DC/DC 11, DC/DC 12 . . . DC/DC 1N, and DC/DC 21, DC/DC 22, DC/DC 23, DC/DC 24, DC/DC 25, DC/DC 26 . . . DC/DC 2(2N−1), DC/DC 2(2N) has the same basic design to enhance simplicity and modularity of the power supply system 10. Nevertheless, to cater for different output requirements, a DC/DC converter of the logic voltage converter system 18 may comprise four-channel DC/DC converters whereas the component power supply converter system 20 may comprise one-channel DC/DC converters. The DC/DC converters may be easily configured in the system to achieve an appropriate output.

DC voltage is input to the DC/DC converter system via the DC power bus 24. The DC voltage is first fed to a high-frequency switch and transformer 60 and then to a rectifier and capacitor 62 for converting the output voltage. To minimize possible damage to the components of the machine, there is a fault detector 64 that analyses the voltage to check for any fault in the signal. The converted DC voltage is also fed to a feedback circuit 66 to monitor the voltage, and a controller 68 is employed to change parameters of the voltage if an adjustment is required based on the feedback. If the fault detector 64 discovers a fault in the voltage, a fault signal 70 is generated and the particular DC/DC converter may be deactivated to avoid any damage to the components. Furthermore, a fault isolator 72 also isolates the DC output terminals 28 from a converter fault. Fault detection and isolation is thus enhanced.

Apart from having DC/DC converters and separate AC/DC rectifiers (which in the above embodiment is built into the power factor correction devices), it is also possible to substitute each DC/DC converter with an equivalent AC/DC converter. Each voltage converter comprising an AC/DC converter should include an isolator, However, such a set-up is likely to be more expensive and bulky, given that an AC/DC converter is relatively more complex than a DC/DC converter.

It would be appreciated that the preferred embodiment may shorten the system design time by having a configurable and scalable system readily applicable to meet various demands. The power rating of the power supply system 10 is optimized by using a parallel current sharing method. By using a modular approach in the manner described, system down-time may be minimized since there are essentially only two main types of modules used that are repeated, namely the power correction devices of the power correction system 16 and the DC/DC converters of the DC/DC converter system 18, 20. Further, there is energy saving because a common bus 24 is used for all components of the machine, as compared to conventional systems which have different buses for different components connected to different power supplies. The common bus approach reduces the wastage of capacity found in present systems, and energy saving is accompanied by a consequent reduction in cost.

The invention described herein is susceptible to variations, modifications and/or additions other than those specifically described and it is to be understood that the invention includes all such variations, modifications and/or additions which fall within the spirit and scope of the above description.

What is claimed is:

1. A power supply system for a machine having a plurality of components, comprising:
   a power source;
   a set of two or more voltage converters connected in series or in parallel and coupled to the power source via a common bus, the set of two or more voltage converters having at least two outputs; and
   a first electrical supply line for supplying a first required voltage to a first set of components and a second electrical supply line for supplying a second required voltage to a second set of components, the first and the second electrical supply line being coupled to the at least two outputs of the set of voltage converters;
   a switching module associated with each voltage converter for interchangeably configuring each voltage converter with at least another voltage converter in series or in parallel, thereby configuring the required voltages to the first and second electrical supply lines.

2. A system as claimed in claim 1, including a power factor correction system coupled between the power source and the voltage converters.

3. A system as claimed in claim 2, wherein the power factor correction system comprises a plurality of power factor correction devices connected in parallel.

4. A system as claimed in claim 3, wherein the power factor correction device includes an AC/DC rectifier.

5. A system as claimed in claim 1, wherein the voltage converters comprise DC/DC converters.

6. A system as claimed in claim 1, wherein the voltage of the common bus is within the range of 300–400V.

7. A system as claimed in claim 1, including an additional voltage converter connected in parallel to the voltage converters for providing an output current that is higher than a current required by the components connected to the electrical supply line.

8. A system as claimed in claim 1, including a separate set of voltage converters coupled to the power source for supplying one or more logic voltages to the machine.

9. A system as claimed in claim 8, wherein the separate set of voltage converters are connected in parallel.

10. A system as claimed in claim 1, wherein the voltage converters comprise AC/DC converters with isolators.

11. A system as claimed in claim 1, including a line filter coupled between the power source and voltage converter for reducing noise from the system.

12. A system as claimed in claim 1, wherein the set of voltage converters is configured to detachably receive additional voltage converters for coupling to the power source and electrical supply line.

13. A system as claimed in claim 1, wherein an output voltage of each voltage converter is greater than 48V.

14. A system as claimed in claim 1, wherein the power consumption of the machine is in the range of 600 W to 4,000 W.

15. A system as claimed in claim 1, wherein the machine is one used for semiconductor assembly.

16. A method of providing a power supply to a machine having a plurality of components, comprising the steps of:
   coupling a set of two or more voltage converters connected in parallel to a power source via a common bus, the set of two or more voltage converters having at least two outputs; coupling a first electrical supply line, for supplying a first required voltage to a first set of components, and a second electrical supply line, for supplying a second required voltage to a second set of components, to the at least two outputs of the set of voltage converters;
   connecting the first set of components to the first electrical supply line and connecting the second set of components to the second electrical supply line; and
   setting a switching module associated with each voltage converter so as to connect each said voltage converter with at least another voltage converter in series or in parallel, thereby configuring the required voltages to the first and second electrical supply lines.

17. A method as claimed in claim 16, including the step of coupling a power factor correction system between the power source and the voltage converters.

18. A method as claimed in claim 17, wherein the power factor correction system comprises a plurality of power factor correction devices connected in parallel.

19. A method as claimed in claim 17, wherein the power factor correction devices include an AC/DC rectifier.

20. A method as claimed in claim 16, wherein the voltage converters comprise DC/DC converters.

21. A method as claimed in claim 16, including coupling a separate set of voltage converters to the power source for supplying one or more logic voltages to the machine.

22. A method as claimed in claim 21, wherein the voltage converters are connected in parallel.

23. A method as claimed in claim 16, wherein the voltage converters comprise AC/DC converters with isolators.

24. A method as claimed in claim 16, wherein the power consumption of the machine is in the range of 600 W to 4,000 W.

25. A power supply system for a machine having a plurality of components, comprising:
   a power source;
   a set of two or more voltage converters connected in series or in parallel and coupled to the power source via a common bus, the set of two or more voltage converters having at least two outputs; and
   a plurality of electrical supply lines, each electrical supply line of said plurality of electrical supply lines supplying a required voltage to a respective set of components, said respective set of components being included in a plurality of sets of components, said plurality of electrical supply lines being coupled to the at least two outputs of the set of voltage converters;
   a switching module associated with each voltage converter for interchangeably configuring each said voltage converter with at least another voltage converter in series or in parallel, thereby configuring the required voltages to said plurality of electrical supply lines.

26. A method of providing a power supply to a machine having a plurality of components, comprising the steps of:
   coupling a set of two or more voltage converters connected in parallel to a power source via a common bus, the set of two or more voltage converters having at least two outputs;
   coupling a plurality of electrical supply lines, each of said plurality of electrical supply lines supplying a required voltage to a respective set of components, said respective set of components being included in a plurality of sets of components, to the at least two outputs of the set of voltage converters;
   connecting each set of components, in said plurality of sets of components, to a respective one of said plurality of electrical supply lines; and
   setting a switching module associated with each voltage converter so as to connect each said voltage converter with at least another voltage converter in series or in parallel, thereby configuring the required respective voltages to each of said plurality of electrical supply lines.

* * * * *